June 1, 1937. E. R. WILLIAMS 2,082,315
LOCKING DEVICE FOR PINS
Filed July 9, 1935
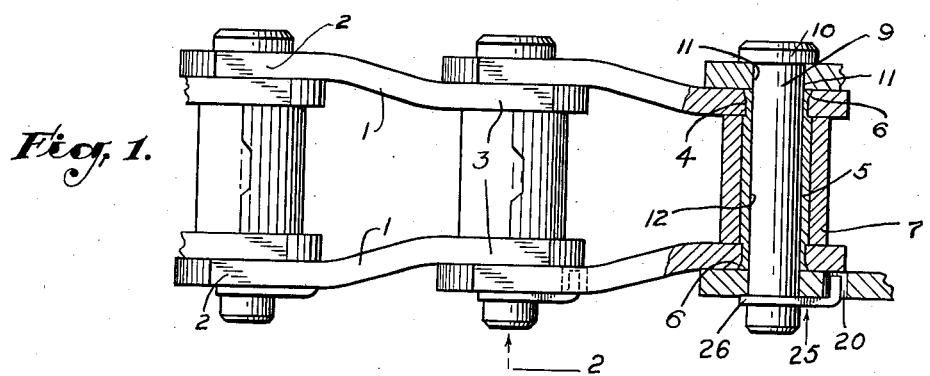
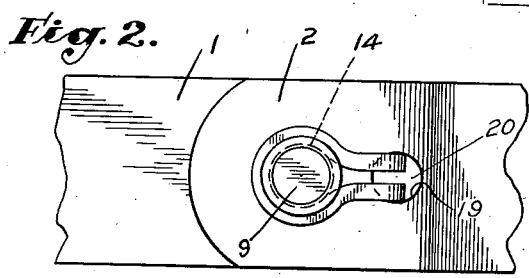
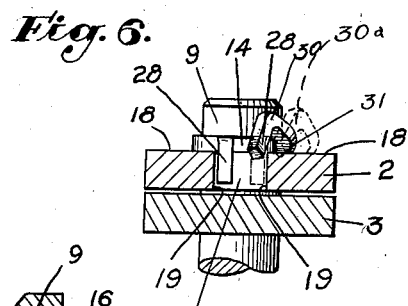
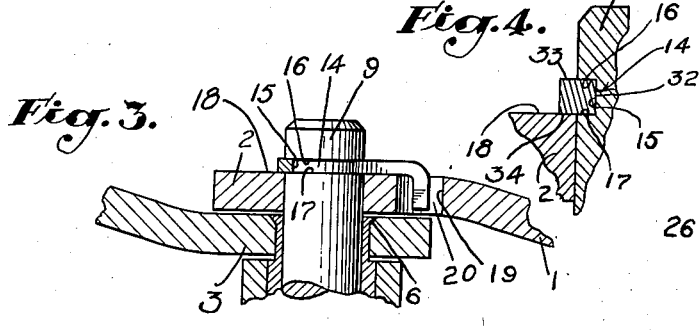
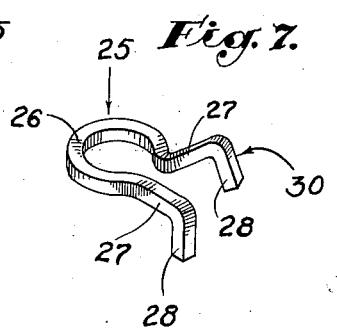
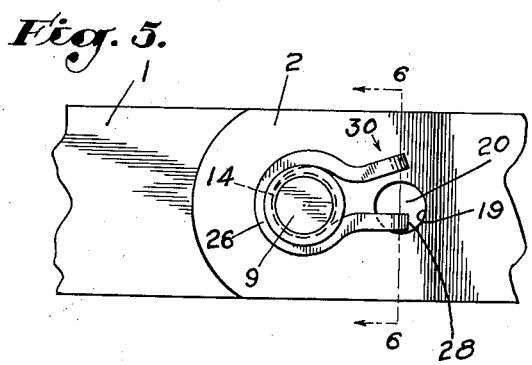
INVENTOR
ERNEST R. WILLIAMS
By
Fred W. Harris
ATTORNEY Patented June 1, 1937

2,082,315

UNITED STATES PATENT OFFICE 2,082,315

LOCKING DEVICE FOR PINS

Ernest R. Williams, Bell, Calif., assignor to Southern Chain Company, Bell, Calif., a corporation of California Application July 9, 1935, Serial No. 30,493

9 Claims. (Cl. 74—254)

My invention relates to sprocket chain and relates particularly to a novel type of locking device whereby the pin or other cylindrical member may be locked or secured in proper assembled position.

In order that the features and advantages of my invention may be better understood I will briefly refer to the oil producing industry where sprocket chains incorporating the features of my invention have a marked utility. In the oil producing industry oil wells are drilled to a depth of as great as 8000 or 9000 feet by use of very massive equipment through which considerable power must be transmitted. The various equipment includes sprockets and sprocket chains through which this power is transmitted to various parts of the equipment. In view of the great stresses and strains to which the sprocket chain is subjected the various links and parts of the sprocket chain are subjected to severe stress and punishment, and it is therefore necessary that the parts be made quite strong. When the sprocket chain is operated under a heavy load there is a tendency for the side bars of the chain to spread, and when this spreading occurs the parts move from their proper positions with the result that the parts will be unduly strained and breakage is liable to occur. Sprocket chains of the usual type include various parts which are assembled on a hinge pin or pintle of the chain. The pintle ordinarily has a head on one end and after assembly of the chain parts has a cotter pin installed through an opening formed in the end of the pintle opposite the head. The ordinary type of cotter pin is not of sufficient strength and is not so designed as to prevent spreading of the parts and therefore breakage is liable to occur, and in actual practice does occur. The cotter keys when subjected to the force exerted by the side bars will break quite readily and when this occurs there is danger of the entire links of the chain becoming disassembled, with the result that the chain may fly off of the sprocket and result in injury either to apparatus or person.

I have invented a locking means which is suitable for locking any tubular member, such as a solid pin or pintle, or a sleeve or projection to another part, and this locking means is particularly adapted for use on sprocket chain of the character mentioned heretofore. My invention, however, is not limited to this one use but may be used wherever it is desired to have a locking member for locking a plurality of parts together.

It is an object of my invention to provide a sprocket chain having a locking means which locks the pintle of the chain in place, which locking means is very economical to produce, easy to install, and easy to remove.

It is a further object of my invention to provide a locking means of the character referred to in which the parts will be permanently locked together when the locking means is installed in place.

It is a still further object of my invention to provide a locking means in which there is a depression or recess formed in one of the members into which an arcuate bight portion of the locking means extends, and in which the locking means is provided with projections or prongs whereby the bight portion may be held in the groove.

Other objects and advantages of my invention will be pointed out in connection with the detailed description of my invention which is to follow.

In the accompanying drawing I have disclosed a preferred form of my invention as applied to sprocket chain adapted for use in the oil producing industry.

Referring to this drawing:

Fig. 1 is a fragmentary view of a sprocket chain partly in section illustrating the features of my invention.

Fig. 2 is a view taken as indicated by the arrow 2 of Fig. 1.

Fig. 3 is an enlarged sectional view of a portion of the chain incorporating the features of my invention and showing the locking member installed in place.

Fig. 4 is an enlarged sectional view taken through a part of the locking member of my invention and showing clearly the manner in which the locking member is installed on one member and engages another member of the assembly on which it is employed to hold parts together.

Fig. 5 is a view similar to Fig. 2 but showing the locking member of my invention being installed in place.

Fig. 6 is a sectional view taken as indicated by the line 6—6 of Fig. 5 and in the direction of the arrows.

Fig. 7 is a perspective view of the locking member of my invention.

Referring to the drawing in detail, and particularly Fig. 1, the sprocket chain disclosed includes side bars 1 which are formed so that the opposite ends thereof are offset from each other, thus providing what I will term outer ends 2 and inner ends 3. When the chain is assembled the inner ends 3 of one link rest inside outer ends 2 of the side bars of an adjacent link. The inner ends 3 of the two side bars, constituting one link of the chain, have openings 4 formed in them and secured in these openings 4 is a bushing 5, as shown at the right end of Fig. 1. The ends of the bushing 5 are enlarged as indicated at 6, such as by swedging operation, in order to secure the bushing and side bars together. Mounted on the bushing 5 is a roller 7 which is adapted to be engaged by the teeth of the sprocket over which the chain is extended. For the purpose of securing the outer ends of one link to the inner ends of an adjacent link I provide a pintle 9 having a head 10 on one end thereof. This pintle 9 extends through openings 11 formed in the outer ends 2 of side bars 1 and extends through the central opening 12 provided by the bushing 5.

For the purpose of locking the pintle in the position shown in the drawing I provide a locking means which constitutes the present invention, and in the form of my invention shown all of the essential features and advantages of my invention are present. The form of my invention shown is the preferred form, but it should be understood that various alterations and modifications may be made in the design without departing from the spirit and scope of my invention which will be defined in the accompanying claims.

As shown best in Figs. 2, 3, and 4, I provide an annular groove 14 in the pintle 9. In the preferred form of my invention disclosed herein the annular groove 14 has a flat bottom wall 15 and flat parallel side walls 16 and 17 which extend in planes perpendicular to the planes of the bottom wall 15. The groove 14 is preferably formed in such a position in the pintle 9 that the side wall 17 rests in substantially the same plane as the outer side wall 18 of the outer end 2 of the link 1 through which the pintle 9 extends. In the end 2 of the link 1 which rests adjacent the projecting end of the pintle 9 I provide engageable walls 19 which are preferably formed by openings 20 being provided in the side bar. Obviously, these engageable walls may be provided in any other equivalent manner, such as by forming channels or such as by upsetting portions of the side bars.

In Fig. 7 I have shown the locking member of the preferred form of my invention in perspective. The locking member is preferably of rectangular cross-section and, in the form of my invention shown, is square. It may, however, be made in other cross-sectional shapes without departing from the spirit and scope of my invention.

The locking member, which I will designate in general by the numeral 25, includes an arcuate bight portion 26. The locking member 25 also includes locking elements in the form of arms 27 and extensions or locking prongs 28. The arms 27 extend outwardly from the bight portion 26 and the prongs 28 extend from the outer ends of the arms 27 preferably at right angles to the arms 27 and preferably in a plane at right angles to the plane in which the bight portion is formed. One of the locking elements, as indicated at 30, has the arm 27 thereof bent upwardly and this is done for the purpose of ease in assembling the locking member, as will be described.

In order to install the locking member in place it is first positioned as illustrated in Figs. 5 and 6. One of the prongs 28 is extended into the opening 20 so that it may engage the side walls 19. It will be seen that the bight portion 26 is partly located in the channel or groove 14 but is not fully in proper position due to the fact that the locking element 30 has not yet been installed in place in the opening 20. It will be seen that the arm 30 rests in such a position that the lower end 31 of the locking prong 28 rests above the plane of the wall 18. This enables the locking member to be installed in the positions shown in Figs. 5 and 6 without any difficulty. After the lock member has been placed in the position shown in Fig. 5, it is necessary to move the locking element 30 toward the other lock element, which has already been placed in its proper position, in order that the prong 28 of the lock member 30 may be brought into a position above the opening 20, as illustrated in Fig. 6. This may be done by the use of a screw driver or pliers. The lock element 30 may in this manner be pried over from dotted line position 30a in Fig. 6 so that the lower end 31 of the prong 28 thereof engages in the upper end of the opening 20 as shown in Fig. 6. This, it will be seen, pulls the parts of the bight portion 26, which is connected to the locking element 30, into the channel or groove 14 so that it is approximately in fully assembled position. After this the locking element 30 is then driven home by the use of a hammer so that the parts then occupy the positions shown in Figs. 1, 2, and 3.

As shown best in Fig. 4, in the preferred form of my invention illustrated herein the bight portion 26 has an inner flat wall 32 which engages the bottom wall 15 of the groove 14. It also has side walls 33 and 34 which engage the side walls 16 and 17 of the groove 14. The bight portion is preferably of such a cross-sectional dimension that it completely fills the groove 14 and the various walls thereof snugly fit against the walls of the groove. This is a preferred arrangement in order that the bight portion and the locking member as a whole will be rather securely assembled on the pin 9 in order that it will form a rigid or firm locking means for the pintle. As illustrated in Fig. 4, the lower or inner side wall 34 of the bight portion 26 projects outwardly from the groove 14 so that it is in engagement with or is engageable by the side wall 18 of the adjacent link. In view of the positioning of the metal in the bight portion 26 which adequately backs up the side wall 34, and in view of the fact that the side wall 34 extends parallel to the side wall 18 of the side bar 1, the bight portion 26 forms an abutment which in actual practice has been found to be highly satisfactory in retaining the parts in assembled position, and furthermore in withstanding any forces or strains imposed against the bight portion 26 by the tendency of the outer ends of the side bars 1 to spread.

It will be seen from an inspection of Fig. 1 that the head 10 and the bight portion 26 of the lock member 25 serve as abutments or shoulders which are secured together by the interposed pin portion of the pintle 9, and that these elements in cooperation hold the parts of the chain in proper assembled position and prevent the spreading of the link parts.

The lock member is readily removed from place by the use of a prying element, such as a screw driver, which is inserted under one of the arms 27 so that one of the lock elements, such as 30 is raised so that the prong 28 is removed from the opening 20. The bight portion may then be readily removed from the groove 14 and the locking member then easily taken from place.

As pointed out heretofore, my invention is not limited to the precise form disclosed and described herein nor is it limited in its application to a sprocket chain. The lock member may be of other cross-sectional forms and size and may be either soft or tempered. My invention is applicable to a wide range of devices and may serve as a locking means on hinge pins, clevis arrangements, or, in fact, in any assembly where it is desired to lock a pin or other projection and some other part in assembled position.

My invention, furthermore, is adapted for use either on a cylindrical pin or a pin of other cross-sectional shape which may be either a solid pin, as illustrated in the drawing, or may be a tubular pin member. In the accompanying claims the term "bight portion" is employed in its broad sense and is to cover the portion 26 of the lock member 25 either in its annular shape as shown or in other shapes such as may be required to have this portion 26 fit into a groove formed in an oblong elliptical or rectangular cross-sectioned member. It is preferable to have the groove 14 of the same shape as the portion of the bight part 26 which fits in it. It is furthermore preferable to have the adjacent wall, such as the wall 34, of the bight 26 placed so that it is in contact with the adjacent wall 18 or its equivalent. However, if desired, some play or space may be left without avoiding the spirit and scope of my invention. It is furthermore possible to employ other means for holding the locking elements in position so that the bight 26 will be secured in the groove 14. It is likewise possible to change the precise shape of the lock elements without departing from the spirit and scope of my invention in its broad concept.

I claim as my invention:

1. In a sprocket chain, side bars and a pintle extending through openings formed in said side bars, said pintle having an annular groove of rectangular cross-section, the combination with: a locking member for locking said parts in assembled position including an arcuate bight portion of rectangular cross-section adapted to rest in said groove and having a side wall which extends parallel to the face of an adjacent side bar and which is engageable therewith, arms extending from said arcuate bight portion in the plane thereof, and prongs extending from said arms and engageable with walls of an opening in one of said side bars for preventing said arms from spreading and thus securing said locking member in place.

2. In a sprocket chain, side bars and a pintle extending through openings formed in said side bars, said pintle having a groove of rectangular cross-section, the combination with: a locking member for locking said parts in assembled position including an arcuate bight portion adapted to rest in said groove and having a side wall which extends parallel to the face of an adjacent side bar and which is engageable therewith, arms extending from said bight portion in the plane thereof, and prongs extending from said arms and engageable with walls of an opening in one of said side bars for preventing said arms from spreading and thus securing said locking member in place.

3. In a lock construction of the class described, a part having an opening therein and a pin extended therethrough, said pin having a groove formed therein, the combination with: a locking member having an arcuate bight portion resting in said groove and engageable by said part, arms extending from said bight portion, and prongs extending from said arms at substantially right angles to the plane of said bight portion and engageable with the walls of an opening in said part for holding said bight portion in said groove.

4. In a lock construction of the class described, a part having an opening therein and a pin extended therethrough, said pin having a groove of rectangular cross-section formed therein, the combination with: a locking member having an arcuate bight portion of rectangular cross-section resting in said groove and engageable by said part, arms extending from said bight portion, and prongs extending from said arms at substantially right angles to the plane of said bight portion and engageable with the walls of an opening in said part for holding said bight portion in said groove.

5. In a lock construction of the class described, a part having an opening therein and a pin extended therethrough, said pin having a groove formed therein, the combination with: a locking member having an arcuate bight portion resting in said groove and having a flat face which is parallel to and engageable by an adjacent face of said part, arms extending from said bight portion, and prongs extending from said arms at substantially right angles to the plane of said bight portion and engageable with the walls of an opening in said part for preventing said arms from spreading and thus holding said bight portion in said groove.

6. A new article of manufacture comprising an arcuate bight part, arms extending from the ends of said part, one of said arms resting in the plane of said part and the other extending at an angle to the plane of said part, and prongs extending at substantially right angles to the plane of said arms.

7. A locking device for holding in place the side bars and pintle of a chain link, comprising: a member having an arcuate bight portion of rectangular cross-section adapted to rest in a groove in said pintle; arms extending from said bight portion in the plane thereof; and prongs extending from said arms and engageable with walls of an opening in one of said side bars for preventing said arms from spreading and thus securing said locking member in place.

8. As a new article of manufacture, a chain link pintle locking device comprising a member having an arcuate bight portion adapted to rest in a groove in said pintle, arms extending from the ends of said bight portion, one of said arms resting in the plane of said bight portion and the other extending at an angle to the plane of said bight portion, and prongs extending from said arms at different angles to the plane of said arms.

9. As a new article of manufacture, a chain link locking device having an arcuate bight portion, arms extending from the ends of said bight portion, one of said arms resting in the plane of said bight portion and the other extending at an angle to the plane of said bight portion, and prongs extending from said arms at substantially right angles thereto.

ERNEST R. WILLIAMS.